(12) United States Patent
Dayama et al.

(10) Patent No.: US 9,294,292 B2
(45) Date of Patent: Mar. 22, 2016

(54) OPTIMIZED MULTICAST ROUTING IN A CLOS-LIKE NETWORK

(71) Applicant: Cisco Technology, Inc., San Jose, CA (US)

(72) Inventors: Deepak Dayama, Santa Clara, CA (US); Raghava Sivaramu, Sunnyvale, CA (US); Dhananjaya Rao, Milpitas, CA (US); Nataraj Bacthu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 14/080,202

(22) Filed: Nov. 14, 2013

(65) Prior Publication Data
US 2015/0131655 A1 May 14, 2015

(51) Int. Cl.
H04L 12/28 (2006.01)
H04L 12/18 (2006.01)
H04L 12/54 (2013.01)
H04L 12/761 (2013.01)
H04L 12/753 (2013.01)
H04L 12/933 (2013.01)
H04L 12/931 (2013.01)
H04L 12/947 (2013.01)
H04L 12/46 (2006.01)

(52) U.S. Cl.
CPC .......... *H04L 12/185* (2013.01); *H04L 12/1886* (2013.01); *H04L 12/5601* (2013.01); *H04L 45/16* (2013.01); *H04L 45/48* (2013.01); *H04L 49/1569* (2013.01); *H04L 49/203* (2013.01); *H04L 49/256* (2013.01); *H04L 12/4675* (2013.01)

(58) Field of Classification Search
CPC .............. H04L 12/185; H04L 12/1886; H04L 12/5601; H04L 45/16; H04L 45/48; H04L 49/1569; H04L 49/203; H04L 49/256
USPC .......................................... 370/351, 389, 390
See application file for complete search history.

(56) References Cited

U.S. PATENT DOCUMENTS 8,428,610 B2    4/2013  Chowdhury et al.
8,467,403 B2 *  6/2013  Tsier et al. .................... 370/420

(Continued)

OTHER PUBLICATIONS

International Search Report and Written Opinion, PCT/US2014/063789, mailed Jan. 8, 2015, 15 pages.

(Continued)

*Primary Examiner* — Chi H Pham
*Assistant Examiner* — Robert Lopata
(74) *Attorney, Agent, or Firm* — Edell Shapiro & Finnan, LLC

(57) ABSTRACT

Techniques are provided for optimizing multicast routing in a network. At a router device, a message is sent to one or more physical devices. The message is configured to solicit a response indicating a network assignment for each of the physical devices. A response message is received from each of the physical devices. The response message comprises network assignment information for each of the physical devices. For each of the physical devices, the network assignment information is translated into a segment identifier. The segment identifier is distributed to other router devices in the network.

20 Claims, 6 Drawing Sheets

(56) References Cited

U.S. PATENT DOCUMENTS

| | | |
|---|---|---|
| 8,539,065 B2 | 9/2013 | Bangalore et al. |
| 2007/0127459 A1* | 6/2007 | Lo et al. .................. 370/389 |
| 2007/0223493 A1* | 9/2007 | Sridhar et al. ........... 370/395.53 |
| 2008/0075078 A1* | 3/2008 | Watanabe .................. 370/390 |
| 2013/0010790 A1* | 1/2013 | Shao ........................ 370/390 |
| 2013/0188514 A1* | 7/2013 | Jain .......................... 370/254 |
| 2015/0055651 A1* | 2/2015 | Shen et al. ................ 370/390 |
| 2015/0085862 A1* | 3/2015 | Song ........................ 370/390 |

OTHER PUBLICATIONS

Jin et al., "Virtualized Integrated Routing & Bridging with centralized control plane draft-jin-nvo3-virb-centralized-00.txt", Internet Engineering Task Force, IETF, Dec. 14, 2012, 10 pages.

Series Q: Switching and Signalling Q3 interface, "Requirements and analysis for the management interface of Ethernet Passive Optical Networks (EPON)", Q.838.1, ITU-T International Telecommunication Union, Oct. 7, 2004, 88 pages.

Tate et al., "IBM j-type Data Center Networking Introduction", URL: http://proquest.safaribooksonline.com/073843420, May 7, 2010, 284 pages.

* cited by examiner

OPTIMIZED MULTICAST ROUTING IN A CLOS-LIKE NETWORK

TECHNICAL FIELD

The present disclosure relates to optimizing multicast traffic routing in a network.

BACKGROUND

Router devices in a network may be configured to manage network communications of one or more physical servers. The physical servers in the network may host one or more virtual machines, and thus, the router devices that manage the network communications of the physical servers may also manage communications of the one or more virtual machines. Typically, router devices may operate as Open Systems Interconnection (OSI) layer 2/layer 3 router devices. In other words, a router device may send and receive layer 2 communications to and from physical servers and may send and receive layer 3 communications to and from other router devices. The physical servers may be configured to send and receive multicast messages to each other via one or more router devices.

DESCRIPTION OF EXAMPLE EMBODIMENTS

Overview

Figure 1:
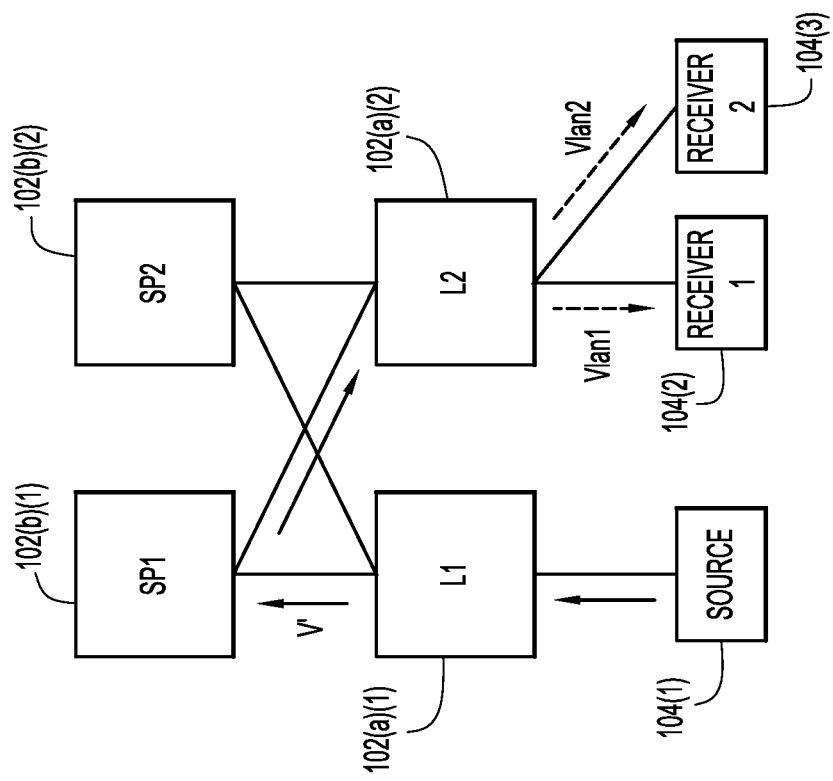
FIG. 1 shows an example network topology including router devices that are configured to translate and forward multicast messages received by a source physical server.

Techniques are presented herein for optimizing multicast traffic routing in a network. At a router device, a message is sent to one or more physical devices. The message is configured to solicit a response indicating a network assignment for each of the physical devices. A response message is received from each of the physical devices. The response message comprises network assignment information for each of the physical devices. For each of the physical devices, the network assignment information is translated into a segment identifier. The segment identifier is distributed to other router devices in the network.

Example Embodiments

The techniques presented herein involve optimizing multicast traffic in a network. In particular, the techniques presented herein enable core encapsulation that is agnostic to router-specific encapsulation techniques performed by routers in a network. Additionally, the techniques presented herein enable routing protocol automatically on nodes that are in a passive mode for core facing interfaces. Such techniques enable network scalability. An example network topology (hereinafter "network") is shown at reference numeral 100 in FIG. 1. The network 100 comprises a plurality of router devices ("routers"), which are shown at reference numerals 102(a)(1), 102(a)(2), 102(b)(1) and 102(b)(2). It should be appreciated that the routers may be switch devices ("switches"), and that these terms may be used interchangeably. For simplicity, the techniques herein use the term "router device" or "router."

Each of the routers in the network 100 is arranged in a particular configuration based on its connectivity to other devices in the network 100. For example, the routers 102(a)(1) and 102(a)(2) are arranged in a first configuration in the network 100 as "leaf" router devices, and the routers 102(b)(1) and 102(b)(2) are arranged in a second configuration in the network as "spine" router devices. The leaf router devices may be referred to as "leaf nodes" and the spine router devices may be referred to as "spine nodes."

The router 102(a)(1) is referred to hereinafter as "leaf 1" or "leaf node 1," and the router 102(a)(2) is referred to hereinafter as "leaf 2" or "leaf node 2." Likewise, the router 102(b)(1) is referred to hereinafter as "spine 1" or "spine node 1," while the router 102(b)(2) is referred to hereinafter as "spine 2" or "spine node 2." It should be appreciated that the network 100 may have any network of leaf nodes and spine nodes, and the topology shown in FIG. 1 is merely an example.

In one example, as shown in FIG. 1, the leaf nodes 102(a)(1) and 102(a)(2) may be arranged in the network 100 such that every leaf node is directly connected to every spine node. Likewise, the spine 102(b)(1) and 102(b)(2) may be arranged in the network 100 such that every spine node is directly connected to every leaf node. Thus, the leaf nodes may be fully-meshed with every spine node. This is also known as a Clos or Clos-like architecture. This arrangement, however, is only an example, and the leaf devices and spine devices may be arranged in other configurations.

The designation of the routers 102(a)(1) and 102(a)(2) as leaf nodes and of the routers 102(b)(1) and 102(b)(2) as spine nodes indicates the device configuration within the network 100. All of the router devices may be the same router device type (e.g., Open Systems Interconnection (OSI) model layer 2 or layer 3 router devices, which may be referred to hereinafter as "layer 2 router devices" or "layer 3 router devices").

FIG. 1 also shows a plurality of physical server devices ("physical devices") at reference numerals 104(1)-104(3). The physical devices 104(1)-104(3) may be, e.g., computers, laptops, tablets, mobile devices, etc. that are configured to send and receive communications to each other in the network 100 via one or more of the routers 104(a)(1), 104(a)(2), 104(b)(1) and 104(b)(2). In FIG. 1, physical device 104(1) is directly connected (or directly "attached") to leaf node 1, and physical devices 104(2) and 104(3) are directly connected to leaf node 2. It should be appreciated that any number of physical devices may be present in the network 100, and these physical devices may be directly or indirectly connected to one or more leaf nodes.

As stated above, the physical devices 104(1)-104(3) are configured to send and receive communications to each other in the network 100. Each of the physical devices 104(1)-104(3) may also host one or more virtual machines (not shown in FIG. 1), and each of these virtual machines may also be configured to send and receive communications to each other in the network 100. For simplicity, FIG. 1 shows physical device 104(1) as a source physical device ("source") and physical device 104(2) and 104(3) as receiver physical device ("receivers"). Source 104(1) may also be referred to herein as the "source," while receiver 104(2) may be referred to herein as "receiver 1" and receiver 104(3) may be referred to herein as "receiver 2."

In one embodiment, the source 104(1) is configured to send multicast communications that are destined for a multicast destination group address for which both the receiver 104(2) and the receiver 104(3) have shown interest. Typically, when the source 104(1) sends a multicast communication, the packet will indicate a multicast destination address or network associated with receiver 104(2) and 104(3). In the example shown in FIG. 1, receiver 104(2) may be assigned or located in a Virtual Local Area Network (VLAN) 1 and receiver 104(3) may be assigned or located in VLAN 2. Thus, when the source 104(1) sends a multicast packet destined for both a multicast group that includes receiver 104(2) and receiver 104(3), the multicast packet will list or indicate a routing context for the packet in the form of a unique identifier.

In traditional network environments, when the source 104(1) sends a multicast packet in the network 100, the multicast packet is typically encapsulated with a layer 3 header. For example, the leaf nodes 102(a)(1) and 102(a)(2) may typically operate as a layer 2/layer 3 router device, such that layer 2 communications are received from attached physical devices, encapsulated with a layer 3 header and forwarded to other router devices in the network 100. Once the packet is received by the router that manages the destination device of the packet, the router decapsulates the layer 3 header and sends the layer 2 packet to the destination physical device or devices. Similarly, if the host 104(1) is a layer 3 host and is sending Internet Protocol (IP) packets to leaf node 102(a)(1), the packets are encapsulated in another packet that describes a virtual routing and forwarding ("VRF") context by specifying a segment identifier. The packet then is decapsulated on leaf node 102(a)(2), which detects the destination VRF of the packet. The leaf node 102(a)(2) then sends the decapsulated packet to the receivers. These traditional encapsulation techniques, however, are specific to the particular encapsulation protocols that are operated by the routers in the network 100. In other words, each router may perform a layer 2 or layer 3 encapsulation on locally originated layer 2 or layer 3 packets according to different packet encapsulation protocols.

When the packet is a multicast packet, this differentiated and fragmented encapsulation among the routers may be especially problematic, since the packet may be forwarded to multiple router devices. In particular, the differentiated and fragmented encapsulation requires multiple routers in a network to send multicast control packets to each other, which may result in network scalability problems.

The leaf nodes may have multicast receivers and senders either directly or indirectly connected to them. The techniques presented herein provide protocol independent core encapsulation techniques for multicast packets. In one example, the core encapsulation techniques are related to a protocol for communications between the leaf nodes and the spine nodes in the network 100. In other words, the techniques herein enable the core encapsulation by the router devices that are agnostic to other router-specific encapsulation techniques operated by routers in the core (interconnect between the spine and leaf nodes) of the network 100. Such techniques achieve optimized replication of multicast packets within the network 100 by minimizing the replication of these packets while supporting load balancing. In particular, the techniques described herein enable the routers to use a segment identifier to define a distribution group of one or more routers in the network 100 for sending multicast packets. In one example, this segment identifier used to specify the VRF (i.e., a routing table instance or "routing table") for the multicast packets. An interface with the routing table instance, shown as V' in FIG. 1, is created automatically and is associated with a transit VLAN in the network 100, referred to herein as VLAN V'. Thus, by utilizing the segment identifier that is associated with transit VLAN V', router devices can encapsulate layer 2 packets agnostically for multicast transmission in the network 100. Additionally, routing protocols are enabled automatically on leaf nodes in a passive mode for fabric (or core) facing interfaces. With control protocol automatically enabled in passive mode on core facing interfaces, the absence of control plane packets due to the decoupling of control protocol and topology maintenance of the core allows a higher flexibility. This allows the fabric to scale to a large number of leaf devices as well as with a large number of tenants.

As shown in FIG. 1, receiver 104(2) belongs to VLAN 1 and receiver 104(3) belongs to VLAN 2. Receiver 104(2) and receiver 104(3) are directly attached to leaf 2. Leaf 2 may send to receiver 104(2) and receiver 104(3) a message that is configured to solicit a response indicating a network assignment for receiver 104(2) and receiver 104(3). This message may be an Internet Group Management Protocol (IGMP) message or it may be any other message configured to solicit network assignment information. In response, receiver 104(2) and receiver 104(3) are each configured to send reports (e.g., via an IGMP response) to leaf 2 to advertise their respective allocations in VLAN 1 and VLAN 2. Upon receiving the reports from receiver 104(2) and receiver 104(3), leaf 2 updates a route forwarding table (e.g., a VRF) to indicate the VLANs to which receiver 104(2) and 104(3) belong. The routing forwarding table may also be a Routing Information Base (RIB) table and/or a table that specifies Multicast Forwarding Information Base Distribution (MFDM) parameters. Leaf 2 then associates (i.e., "maps") VLAN 1 and VLAN 2 to the transit VLAN V'. That is, in the VRF of leaf 2, VLAN 1 and VLAN 2 (and other VLANs associated with other physical devices attached to leaf 2) are mapped to a segment identifier associated with the transit VLAN V'. Leaf 2 then sends this mapping information to all of the other routers in the network 100. Upon receiving this mapping information, the other routers in the network 100 store the mapping in their respective route forwarding tables. Thus, leaf 1, spine 1 and spine 2 are provided with information (e.g., the segment identifier) of the mapping of VLAN 1 and VLAN 2 to VLAN V'.

As stated above, VLAN V' defines a distribution group of router devices in the network 100 through which multicast packets may be sent. For example, the distribution group defined by VLAN V' may include a subset of the routers in the network 100 to enable optimal distribution of a multicast packet with minimal packet replication. The distribution group of router devices may be established ad hoc or a priori by a network administrator, depending on, for example, network conditions (e.g., bandwidth, latency or other network characteristics).

In FIG. 1, when the source 1 sends a multicast packet that is destined for receiver 1 and receiver 2, the source 1 sends a layer 2 multicast packet that lists receiver 1 and receiver 2 as the destination address in VLAN 1 and VLAN 2 respectively. Upon receiving the multicast packet, leaf 1 modifies (e.g., encapsulates) the packet to include the segment identifier associated with VLAN V' (which has been mapped to VLAN 1 and VLAN 2 by leaf 2). The segment identifier enables the multicast packet to be sent as a layer 3 packet (e.g., a Protocol Independent Multicast (PIM) packet). In one example, PIM is enabled on every router in order to minimize network traffic, which is essential for supporting a high scale of multi-tenancy. Leaf 1 then forwards the packet to the next hop router that is a part of the distribution group associated with VLAN V'. The multicast packet is forwarded through VLAN V', and ultimately reaches leaf 2. Upon receiving the multicast packet, leaf 2 analyzes (e.g., decapsulates) the packet to retrieve the segment identifier, and subsequently maps the segment identifier for VLAN V' to VLAN 1 and VLAN 2. Upon such decapsulation, leaf 2 routes the multicast traffic in layer 2 to receiver 1 and receiver 2, which reside in VLAN 1 and VLAN 2, respectively.

Figure 2:
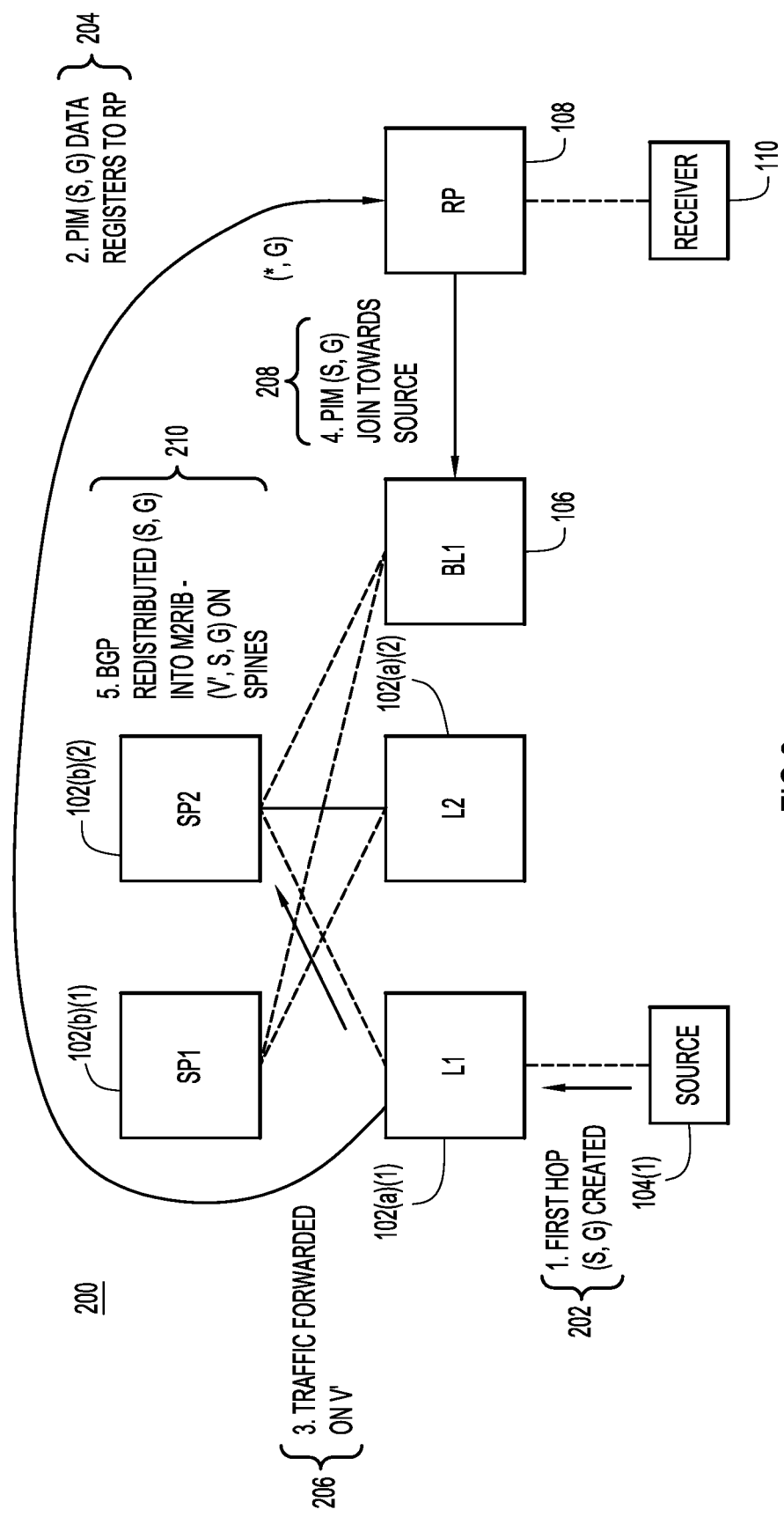
FIG. 2 shows an example network topology including router devices that are configured to translate and forward multicast messages to a remote physical server.

Reference is now made to FIG. 2. FIG. 2 shows an example network 200 that includes the routers 102(a)(1), 102(a)(2), 102(b)(1) and 102(b)(2), described in FIG. 1. FIG. 2 also includes a border router device ("border router" or "border") shown at reference numeral 106 and a rendezvous point (RP) router device ("RP router" or "RP") shown at reference numeral 108. In one example, the border 106 may be a border leaf (shown as "BL1" in FIG. 2). The border 106 is connected to every spine in the network, and the RP 108 is connected only to the border 106. Thus, the RP 108 is said to be remote to the other routers in the topology. The border 106 and the RP 108 may be, for example, router devices that operate as layer 2/layer 3 router devices. Network 200 also has physical devices shown at reference numerals 104(1) and 110. The physical device 104(1) is the source physical device (source) described in connection with FIG. 1, above, and it is directly attached to leaf 1. The physical device 110 is a physical device that is directly attached to the RP. Thus, the physical device 110 is also referred to as a remote physical device. In FIG. 2, the physical device 110 is referred to as the "receiver 110."

In FIG. 2, the source 104(1) is configured to send multicast communications destined for the receiver 110. It is assumed that leaf 1 has received the segment identifier for the transit VLAN (VLAN V') a priori from one or more routers or other network device before the source 104(1) sends communications to the receiver 110. For example, leaf 1 may have received the segment identifier for VLAN V' as described by the techniques in connection with FIG. 1, above. In FIG. 2, the source 104(1) sends a layer 2 multicast packet to leaf 1. Upon receiving the layer 2 multicast packet, leaf 1 creates state information for the packet (e.g., an (S, G) state, where "S" represents a source device and "G" represents a destination device), as shown at reference numeral 202.

As shown at reference numeral 204, leaf 1 sends a PIM packet (including the state information and the segment identifier for VLAN V') to RP 108. The PIM packet comprises a core encapsulation (e.g., a layer 3 encapsulation) of the multicast packet (e.g., a layer 2 multicast packet) originating from the source 104(1). It should be appreciated, however, that the techniques described herein are not limited to layer 2 packets encapsulated in layer 3 packets. In particular, some embodiments may involve core encapsulation techniques comprising layer 3 encapsulation in layer 2 packets or other types of core encapsulation.

For example, as shown at reference numeral 206, leaf 1 modifies the packet to include the segment identifier for the fabric VLAN V' in the destination address and forwards the packet to the routers in the network 200. The spine nodes, however, will initially drop this packet since these routers have not received state information or the segment identifier associated with the fabric VLAN V'. Meanwhile, the RP 108, at 208, sends the state information and segment identifier to the border 106. The border 106 installs the state information and segment identifier in its route forwarding table (e.g., VRF), and distributes the state information and segment identifier (e.g., via a Border Gateway Protocol (BGP) message) to the other routers in the network 200, as shown at 210. For example, the state information and segment identifier may be distributed into a Multicast Routing Information Base (MRIB) table accessible by the spine nodes. After doing so, the spine nodes receive the state information and segment identifier associated with VLAN V'. Thus, upon receiving this information, every router in the network stores the state information and segment identifier for VLAN V' in its respective route forwarding table, and as a result, subsequent multicast packets originating from the source 104(1) can be forwarded in the network 200 using the transit fabric VLAN V'.

Figure 3:
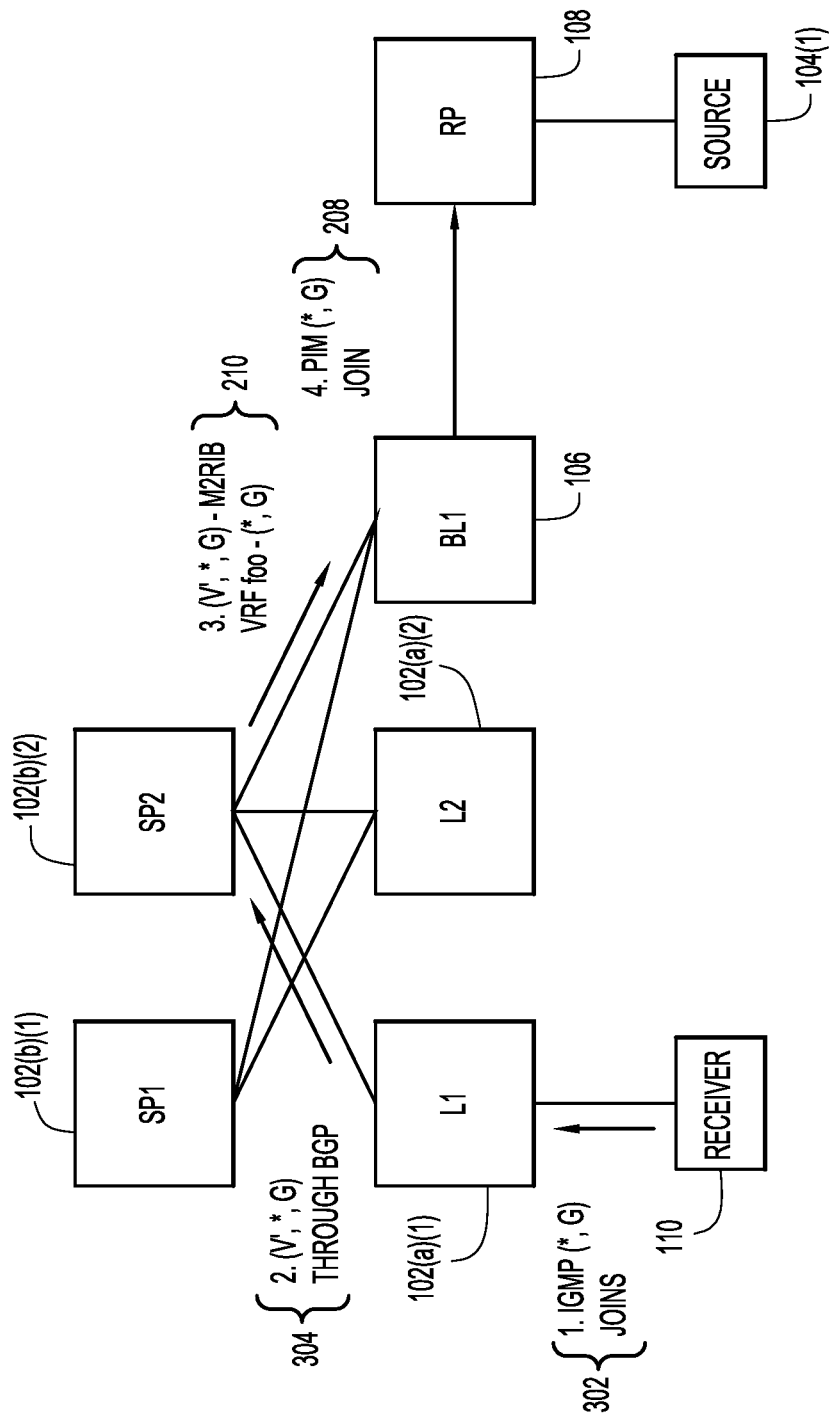
FIG. 3 shows an example network topology including router devices that are configured to receive multicast messages from the remotely located source physical server.

Reference is now made to FIG. 3, which shows an example network 300. The network 300 is similar to the network 200 shown in FIG. 2 except that in FIG. 3, the source 104(1) is remote and is directly attached to RP 108 instead of to leaf 1 and the receiver 110 is not remote, and instead is directly attached to leaf 1 instead of to the RP 108. In FIG. 3, the receiver 110 sends, at reference numeral 302, an IGMP message to leaf 1 indicating network assignment information associated with the receiver 110 (e.g., the VLAN(s) to which receiver 110 is assigned). Leaf 1 maps the network assignment information to the segment identifier information associated with the transit VLAN V', and at 304, sends the mapping information to the other routers in the network 300, except the RP 108 (since RP 108 is only connected to the border 106). The border 106, upon receiving the mapping information, updates its route forwarding table at reference numeral 306. The border 106, thus, has the layer 3 entry for the fabric VLAN V' (e.g., the segment identifier for VLAN V'). At reference numeral 308, the border 106 sends this information (as a PIM communication) to RP 108, and the RP 108 stores this information in its route forwarding table. As a result, the source 104(1) is thus able to send layer 2 multicast packets via the RP 108, and the RP 108 is able to forward these packets in the network 300 using the segment identifier for VLAN V' for core encapsulation and forwarding.

Figure 4:
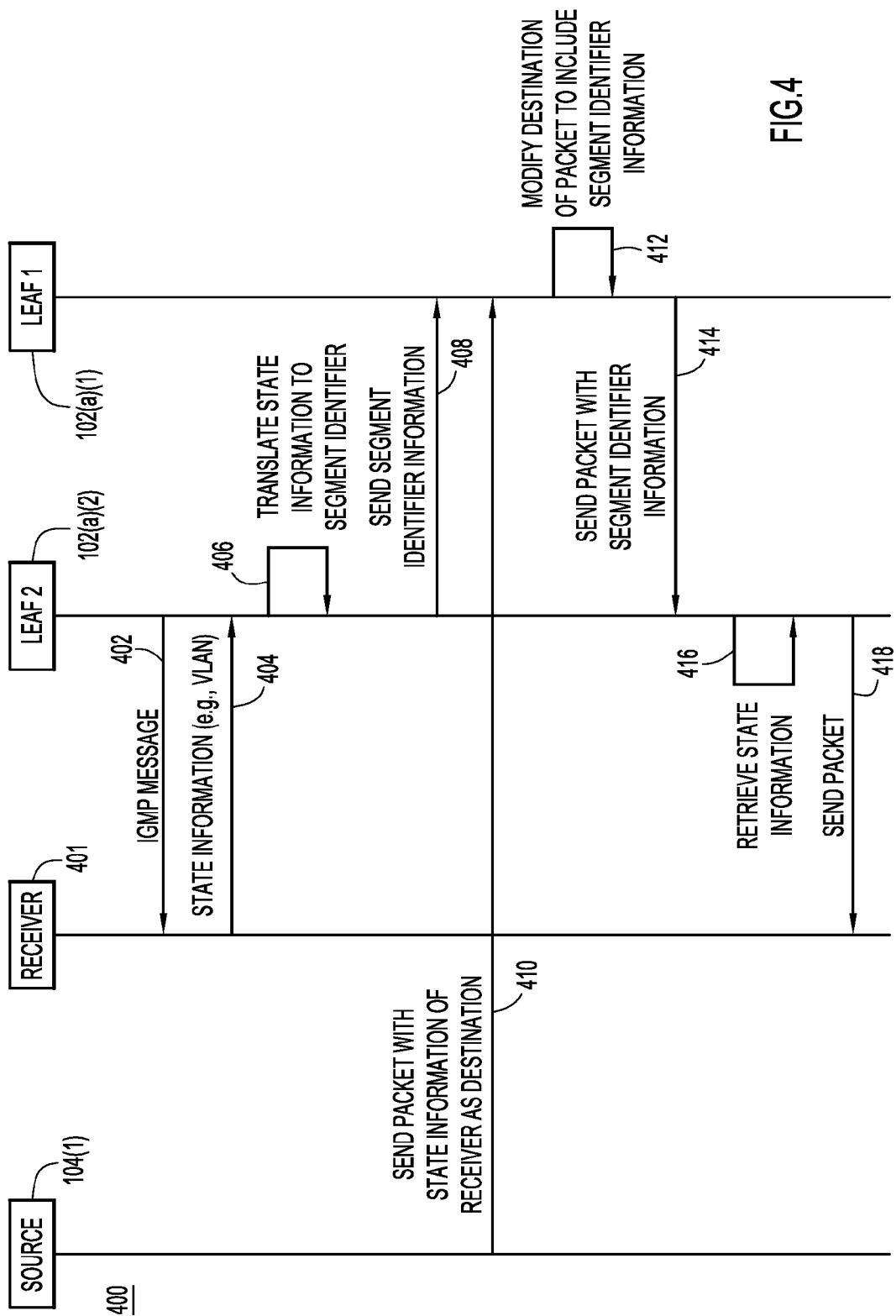
FIG. 4 shows an example ladder diagram depicting operations for sending the multicast message in the network according to the techniques presented herein.

Reference is now made to FIG. 4, which shows an example ladder diagram 400 depicting operations for sending a multicast message in a network according to the techniques presented herein. For simplicity, the ladder diagram 400 shows communications as described above in connection with FIG. 1, though it should be appreciated that these techniques may be applicable to any of the embodiments described herein. In FIG. 4, at reference numeral 402, leaf 2 sends a message (e.g., an IGMP message) to a receiver. The receiver in FIG. 4 may be either the receiver 104(2) ("receiver 1" in FIG. 1) or receiver 104(3) ("receiver 2" in FIG. 1). For simplicity, the receiver in FIG. 4 is referred to simply as receiver 401. The IGMP message sent from leaf 2 to the receiver 401 is a message that is configured to solicit a response indicating a network assignment for the receiver 401 (e.g., the VLAN to which receiver 401 belongs). At reference numeral 404, the receiver 401 responds to the IGMP message by sending to leaf 2 its state information, including its VLAN assignment. Leaf 2, at 406, translates the state information to a segment identifier associated with the fabric VLAN V'. Leaf 2 stores this information in its route forwarding table and, at 408, sends the segment identifier information to leaf 1. Leaf 1 also stores the segment identifier information in its route forwarding table.

At 410, the source 104(1) sends a subsequent layer 2 multicast packet with state information that indicates the receiver 401 as the destination. At 412, leaf 1 receives the multicast packet and modifies the destination of the multicast packet to include the segment identifier information associated with fabric VLAN V' (previously obtained from leaf 2 in operation 408). For example, leaf 1 encapsulates the layer 2 multicast packet with a layer 3 segment identifier header. Leaf 1 then sends, at 414, the layer 3 encapsulated multicast packet with the segment identifier information to leaf 2. Leaf 2, upon receiving the multicast packet, retrieves the state information (e.g., decapsulates the layer 3 segment identifier header in the packet) for the receiver 401 at 416, and at 418, leaf 2 sends the layer 2 multicast packet to the receiver 401.

Figure 5:
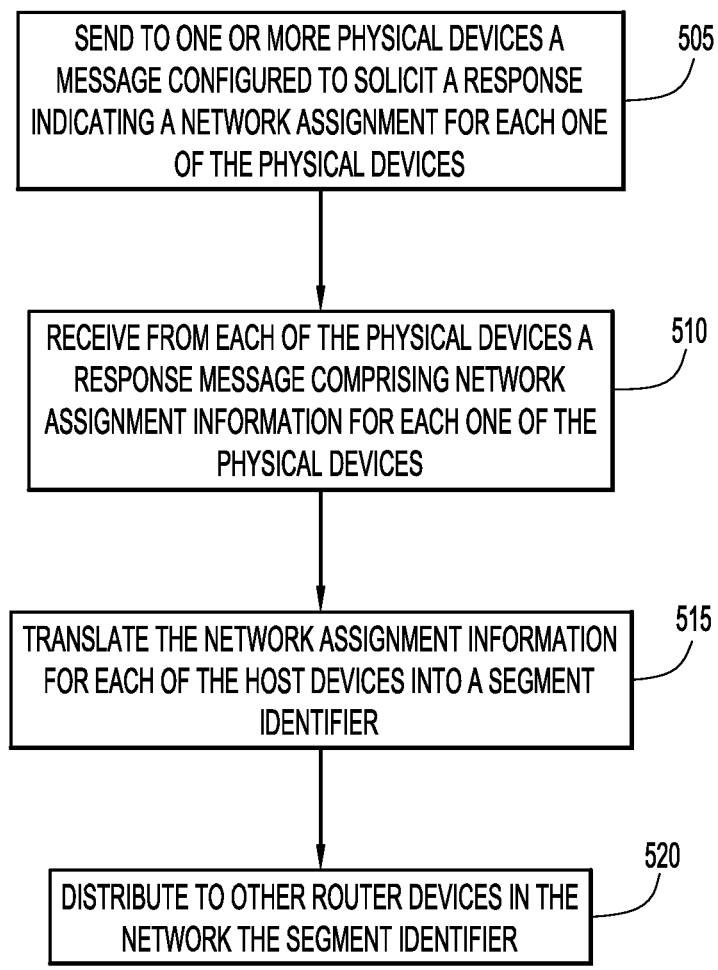
FIG. 5 shows an example flow chart depicting operations of the router device in translating and forwarding multicast messages in the network.

Reference is now made to FIG. 5, which shows an example flow chart 500 depicting operations of a router device translating and forwarding a multicast message in a network. The router device in FIG. 5 may be any of the routers described herein. At operation 505, a message is sent to one or more physical devices. The message is configured to solicit a response indicating a network assignment for each of the host devices. At 510, a response message is received from each of the physical devices comprising network assignment information for each of the physical devices. The network assignment information is translated, at 515, for each of the physical devices into a segment identifier, and at 520, the segment identifier is distributed to other router devices in the network.

Figure 6:
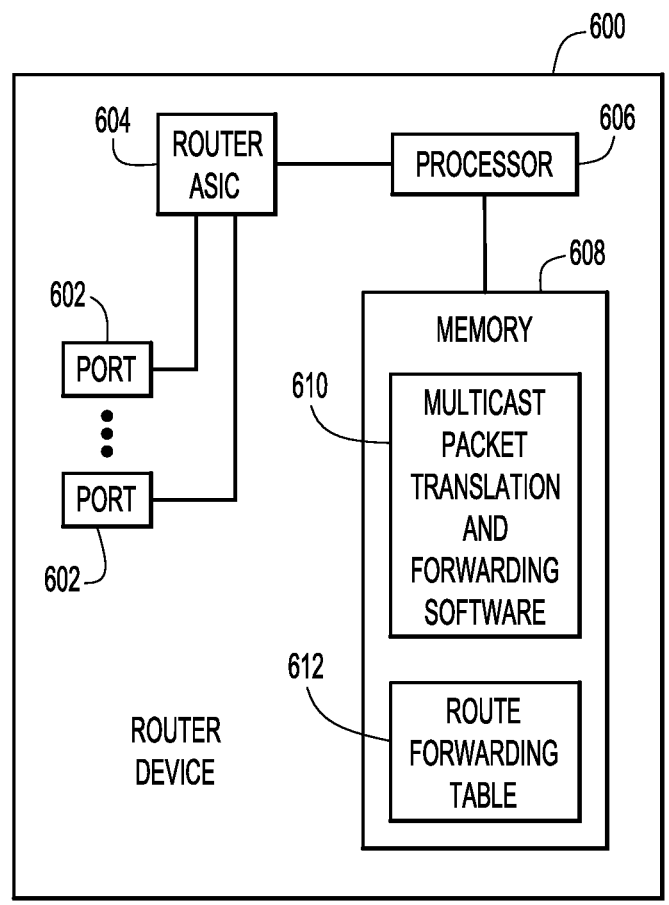
FIG. 6 shows an example block diagram of the router device that is configured to translate and forward the multicast message according to the techniques presented herein.

Reference is now made to FIG. 6, which shows an example block diagram of a router device configured to translate and forward a multicast message. The router device in FIG. 6 is referred to generally as router 600, though it should be appreciated that the router device 600 may be any of the router devices described herein. The router device 600 comprises, among other components, a plurality of port units 602, a router application specific integrated circuit (ASIC) 604, a processor 606 and a memory 608. The ports 602 receive communications (e.g., frames) from network devices and are configured to send communications to network devices. For example, the ports 602 send IGMP messages destined for physical devices and receive IGMP response messages from physical devices. The ports 602 also send and receive mapping information including the segment identifier and other state information of physical network devices. The ports 602 are coupled to the router ASIC 604. The router ASIC 604 receives instructions from the processor 606 and forwards frames and/or packets to an appropriate one of the port units 602 for transmission to a destination network device. The router ASIC 604 is coupled to the processor 606. The processor 606 is, for example, a microprocessor or microcontroller that is configured to execute program logic instructions (i.e., software) for carrying out various operations and tasks of the switch device 600, as described above. For example, the processor 606 is configured to execute multicast packet translation and forwarding software 610 according to the techniques described above. The multicast translation and forwarding software 610 also instructs the processor to update a route forwarding table 612 with segment identifier information, as described herein. The functions of the processor 606 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 608 may comprise read only memory (ROM), random access memory (RAM), magnetic disk storage media devices, optical storage media devices, flash memory devices, electrical, optical, or other physical/tangible (non-transitory) memory storage devices. The memory 608 stores software instructions for the multicast translation and forwarding logic 610. The memory 608 also stores the route forwarding table 612. Thus, in general, the memory 608 may comprise one or more computer readable storage media (e.g., a memory storage device) encoded with software comprising computer executable instructions and when the software is executed (e.g., by the processor 606) it is operable to perform the operations described for the multicast packet translation and forwarding software 610.

The multicast packet translation and forwarding software 610 may take any of a variety of forms, so as to be encoded in one or more tangible computer readable memory media or storage device for execution, such as fixed logic or programmable logic (e.g., software/computer instructions executed by a processor), and the processor 606 may be an ASIC that comprises fixed digital logic, or a combination thereof.

For example, the processor 606 may be embodied by digital logic gates in a fixed or programmable digital logic integrated circuit, which digital logic gates are configured to perform the multicast packet translation and forwarding software 610. In general, the multicast packet translation and forwarding software 610 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the routers and physical devices may be performed by one or more computer or machine readable storage media (non-transitory) or device executed by a processor and comprising software, hardware or a combination of software and hardware to perform the techniques described herein.

In summary, a method is provided comprising: at a router device in a network, sending to one or more physical devices a message configured to solicit a response indicating a network assignment for each of the physical devices; receiving from each of the physical devices a response message comprising network assignment information for each of the physical devices; translating the network assignment information for each of the physical devices into a segment identifier; and distributing the segment identifier to other router devices in the network.

In addition, a computer-readable storage media is provided that is encoded with software comprising computer executable instructions and when the software is executed operable to: send to one or more physical devices in a network a message configured to solicit a response indicating a network assignment for each of the physical devices; receive from each of the physical devices a response message comprising network assignment information for each of the physical devices; translate the network assignment information for each of the physical devices into a segment identifier; and distribute the segment identifier to router devices in the network.

Furthermore, an apparatus is provided comprising: a plurality of ports configured to receive and send messages in a network; and a processor coupled to the ports, and configured to: send to one or more physical devices a message configured to solicit a response indicating a network assignment for each of the physical devices; receive from each of the physical devices a response message comprising network assignment information for each of the physical devices; translate the network assignment information for each of the physical devices into a segment identifier; and distribute the segment identifier to router devices in the network.

The above description is intended by way of example only. Various modifications and structural changes may be made therein without departing from the scope of the concepts described herein and within the scope and range of equivalents of the claims.

What is claimed is:

1. A method comprising:
at a router device in a network, sending to one or more physical devices directly attached to the router device a message configured to solicit a response indicating a network assignment for each of the physical devices;
receiving from each of the physical devices a response message comprising network assignment information for each of the physical devices;
generating a segment identifier that defines a distribution group of one or more routers including the router device;
associating one or more Virtual Local Area Networks (VLANs), to which the one or more physical devices belong, with the segment identifier based on the network assignment information for each of the physical devices;
updating a route forwarding table to indicate that the segment identifier defines the distribution group, wherein a multicast packet destined for at least one of the one or more physical devices is to be routed to the router device using a routing context indicated by the segment identifier; and
distributing the segment identifier to other router devices in the network.

2. The method of claim 1, wherein sending comprises sending an Internet Group Management Protocol (IGMP) message to the physical devices.

3. The method of claim 1, wherein receiving comprises receiving from each of the physical devices a response message comprising information indicating a Virtual Local Area Network (VLAN) to which the physical devices are assigned.

4. The method of claim 1, further comprising:
at another router device in the network, receiving the segment identifier;
receiving from a source physical device a packet that includes network assignment information for a destination physical device; and
generating a modified packet from the packet, the modified packet including the segment identifier in a destination address.

5. The method of claim 4, wherein receiving the packet comprises receiving a multicast packet.

6. The method of claim 4, further comprising sending the modified packet to router devices in the network that are part of the distribution group associated with the segment identifier.

7. The method of claim 1, wherein the segment identifier identifies a transit Virtual Local Area Network (VLAN) for one or more router devices in the network to provide protocol independent core encapsulation for multicast packets.

8. The method of claim 1, wherein distributing comprises distributing the segment identifier to other router devices in the network to enable Open Systems Interconnection layer 3 forwarding of multicast communications between the router devices in the network using the segment identifier.

9. The method of claim 1, wherein distributing comprises distributing the segment identifier to enable a control protocol at the other router devices in a passive mode.

10. A non-transitory computer-readable storage media encoded with software comprising computer executable instructions and when the software is executed operable to:
send to one or more physical devices in a network directly attached to a router device a message configured to solicit a response indicating a network assignment for each of the physical devices;
receive from each of the physical devices a response message comprising network assignment information for each of the physical devices;
generate a segment identifier that defines a distribution group of one or more routers including the router device;
associate one or more Virtual Local Area Networks (VLANs), to which the one or more physical devices belong, with the segment identifier based on the network assignment information for each of the physical devices;
update a route forwarding table to indicate that the segment identifier defines the distribution group, wherein a multicast packet destined for at least one of the one or more physical devices is to be routed to the router device using a routing context indicated by the segment identifier; and
distribute the segment identifier to other router devices in the network.

11. The non-transitory computer readable storage media of claim 10, wherein the instructions that are operable to send comprise instructions that are operable to send an Internet Group Management Protocol (IGMP) message to the physical devices.

12. The non-transitory computer readable storage media of claim 10, wherein the instructions operable to receive comprise instructions operable to receive from each of the physical devices a response message comprising information indicating a Virtual Local Area Network (VLAN) to which the physical devices are assigned.

13. The non-transitory computer readable storage media of claim 10, wherein the segment identifier identifies a transit Virtual Local Area Network (VLAN) for one or more router devices in the network to provide protocol independent core encapsulation for multicast packets.

14. The non-transitory computer readable storage media of claim 10, wherein the instructions operable to distribute comprise instructions operable to distribute the segment identifier to other router devices in the network to enable Open Systems Interconnection layer 3 forwarding of multicast communications between the router devices in the network using the segment identifier.

15. An apparatus comprising:
a plurality of ports configured to receive and send messages in a network; and
a processor coupled to the ports, and configured to:
send to one or more physical devices directly attached to the apparatus a message configured to solicit a response indicating a network assignment for each of the physical devices;
receive from each of the physical devices a response message comprising network assignment information for each of the physical devices;
generate a segment identifier that defines a distribution group of one or more routers including the apparatus;
associate one or more Virtual Local Area Networks (VLANs), to which the one or more physical devices belong, with the segment identifier based on the network assignment information for each of the physical devices;
update a route forwarding table to indicate that the segment identifier defines the distribution group, wherein a multicast packet destined for at least one of the one or more physical devices is to be routed to the apparatus using a routing context indicated by the segment identifier; and distribute the segment identifier to other router devices in the network.

16. The apparatus of claim 15, wherein the processor is further configured to send an Internet Group Management Protocol (IGMP) message to the physical devices.

17. The apparatus of claim 15, wherein the processor is further configured to receive from each of the physical devices a response message comprising information indicating a Virtual Local Area Network (VLAN) to which the physical devices are assigned.

18. The method of claim 3, wherein the segment identifier is associated with at least two different VLANs to which at least two physical devices directly attached to the router device belong.

19. The non-transitory computer readable storage media of claim 10, wherein the segment identifier is associated with at least two different VLANs to which at least two physical devices directly attached to the router device belong.

20. The apparatus of claim 15, wherein the segment identifier is associated with at least two different VLANs to which at least two physical devices directly attached to the apparatus belong.

\* \* \* \* \*